United States Patent [19]

Brooks

[11] Patent Number: 4,761,715

[45] Date of Patent: Aug. 2, 1988

[54] LASER POINTER

[75] Inventor: Bradford L. Brooks, Hopkington, N.H.

[73] Assignee: Beede Electrical Instrument Co., Inc., Penacook, N.H.

[21] Appl. No.: 30,178

[22] Filed: Mar. 25, 1987

[51] Int. Cl.⁴ .............................................. G01D 11/28
[52] U.S. Cl. ...................................... 362/23; 362/26; 116/286; 116/DIG. 5
[58] Field of Search ............................... 362/23, 26–30, 362/32, 800; 116/286–288, 310, DIG. 5, DIG. 26, DIG. 36

[56] References Cited

U.S. PATENT DOCUMENTS 2,392,581  1/1946  Juhasz ................................. 116/284
3,578,973  5/1971  Dooley et al. ......................... 362/32

Primary Examiner—Samuel Scott
Assistant Examiner—Noah Kamen
Attorney, Agent, or Firm—Weingarten, Schurgin, Gagnebin & Hayes

[57] ABSTRACT

A pointer for use with an analog meter movement providing a luminous indication of the meter position. The present invention provides an analog meter movement indicator which selectively directs a laser light or other collimated beam across the contoured face or dial or an analog meter, wherein the selective movement of the light beam and the resulting luminous image is provided by a selective movement of an optical deflector mounted on the shaft of the meter movement. The optical deflector is optically energized by an externally mounted, stationary light source. As the meter movement shaft is rotated, the luminous beam image moves over the dial face according to the signal applied to the meter movement. The resulting instrument provides a dramatic indication of analog meter signal presentation.

14 Claims, 1 Drawing Sheet

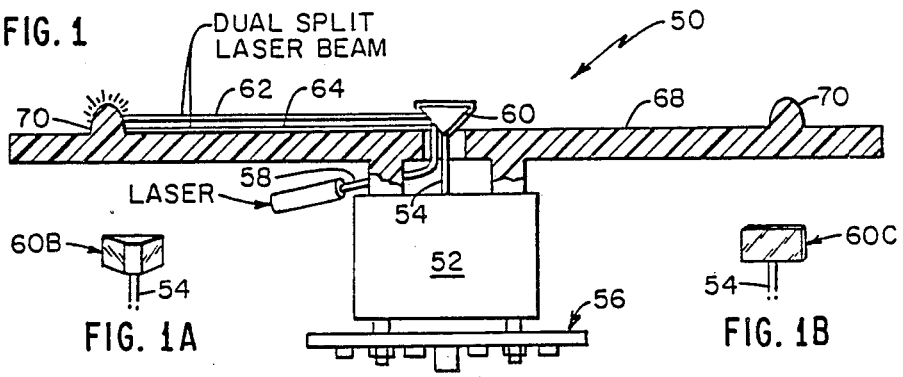
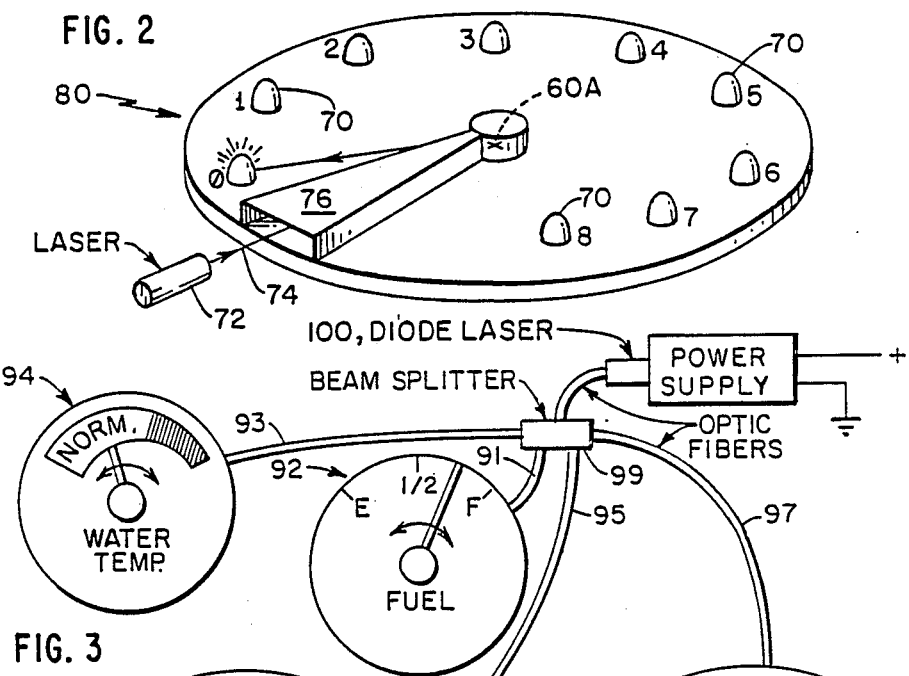
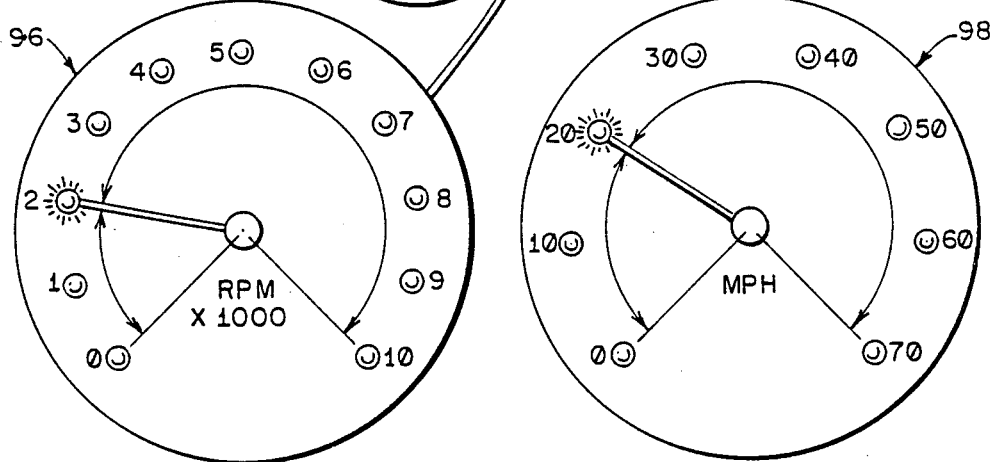

LASER POINTER

FIELD OF THE INVENTION

The present invention relates to analog meter pointer mechanisms, and in particular to an analog meter pointer comprising a laser or collimated light source providing a luminous image corresponding to the signal received by the analog meter movement.

BACKGROUND OF THE INVENTION

Traditional analog meter movements typically comprise a linearly or rotationally movable indicator (pointer) connected to a meter movement arm or shaft which provides a positional movement in direct relationship to an energizing signal. In addition, a dial or face plate is interposed or juxtaposed in close relationship to the meter indicator to provide a reference for interpretation of the magnitude or other parameter of the energization signal. However, traditional meter assemblies require precision assembly and alignment of the meter pointer to the meter movement so that the pointer is properly aligned with the dial face or panel markings, and further that the needle be properly spaced from the panel to permit movement thereof without contact to the surface of the meter face. In actuality when one reads an analog meter having a needle movable over the surface of having numbers or other values imprinted thereon, the observer must first note the position of the needle and secondly transfer or translate the position of that needle to a number or other meter designator in the closest proximity. The observer then "reads" the meter by making the transition from needle to face with a minimal amount of error. (However, the provision of clearance between the needle and the face of the meter provides an opportunity for parallax error to be introduced in the process of reading the meter.) In view of parallax and other errors, a meter may include additional structure, such as a mirrored face to permit the observer to verify the position of the needle by minimizing the parallax induced error at the expense of a restricted viewing positions. Thus, the analog meter, while providing the direct relative indication of a signal parameter, requires an approximation from the observer which provides an opportunity for the introduction of errors. Furthermore, the traditional meter requires precision construction and alignment so that the spacing between the needle and the face is maintained to desired specifications.

SUMMARY OF THE INVENTION

The present invention comprises an analog meter laser or collimated light pointer which provides a direct analog indication of the signal parameter slightly above or on the face of the meter, avoiding the secondary step of needle interpretation, and thus eliminating the parallax error. Thus, the meter provides a well defined indication according to a linear or angular analog position corresponding to the signal provided to the meter movement. Furthermore, the present invention provides the opportunity to impart secondary interpretation of the signal according to variations in the color of the light and variations in images presented according to selected surface textures and structures thereon. Furthermore, by the use of selected laser or collimated light colors and meter panel surface treatment, a high contrast ratio may be provided to provide a dramatic indication of system parameters.

BRIEF DESCRIPTION OF THE DRAWING

These and other features of the present invention will be better understood by reading the detailed description of the invention, together with the drawing, wherein:

FIG. 1 is a cross-sectional view of one embodiment of the laser pointer according to the present invention;

FIGS. 1A and 1B show different embodiments of light deflectors;

FIG. 2 is a meter movement showing a second embodiment of the laset pointer according to the present invention; and FIG. 3 is a diagram showing a typical instrumentation cluster having a common light source.

DETAILED DESCRIPTION OF THE DRAWING

FIG. 1 shows a cross-sectional view of one embodiment 50 of the present invention which includes a meter mechanism 52 which includes a shaft 54 providing a rotational movement according to meter mechanism energization signals provided by external circuitry 56. The shaft having a rotational movement receives an optical deflector 60 which receives laser illumination through a fiber optic element 58, and provides a selectable plurality of beams 62 and 64, wherein the position of the beams 62 and 64 relative to the face of the meter 68 is determined according to the angular position of the shaft 54. In this embodiment, the separate beams of light 62 and 64 respectively are selectively deployed to provide illumination of the formed plastic designators 70, comprising plastic extrusions to encircle the optical deflector 60, and to receive the beam of light 62 upon selective energization of the meter mechanism 52. Similarly, the second beam of light 64 serves to illuminate selected portions of the surface 68 coincidental with the position of the first beam of light 62 and the illumination of the corresponding designator 70. Thus the apparatus according to the present invention directly illuminates the surface 68 and designators 70 of the analog meter movement, providing a dramatic indication of the energization signal of the meter mechanism 52, and eliminates the parallax error problem while providing a more convenient and more manufacturable meter component. In a second embodiment of the present invention envisions the radial position of the light source 72 to directly energize or excite the optical deflector 60A which in turn selectively illuminates the designators 70 according to the angular position provided by the meter mechanism 52. Under certain conditions, i.e., the suspension of particulate matter in the atmosphere, the light path 74 from the source 72 to the optical deflector 60A becomes visible. Therefore, according to this embodiment, a shroud 76 is desirable to block the source beam of light 74 from direct viewing.

An instrument cluster 90 is shown in FIG. 3, including a plurality of analog displays 92, 94, 96 and 98 wherein each display includes the laser pointer as previously discussed, or variations thereof. The individual instrument 92 . . . 98 is supplied by a light from a common diode laser a collimated light source 100 whose light signal is divided by an optical splitter 99 and directed to each individual meter element through optical fibers 91, 93, 95 and 97. The instrument cluster arranged in this manner provides a coherent visual presentation of signals, providing unambiguous signal interpretations by direct viewing on the surface of the individual meter graphics.

In practice, the maximum angle of rotation or sweep of the laser pointed is determined only by the configuration of the optical deflector 60 and the geometry of the source beam. The optical deflector 60 can comprise a variety of optics including a mirror 60B, and may further include a dove prism 60C shown in FIGS. 1A and 1B, which may be used to increase the apparent angle of shaft 54 rotation, so that the produced beams of light (62, 64) sweeps more than angle of rotation of the shaft 54. Moreover, a further plurality of light beams could be imparted on the face of meter by the use of selected vertical detail of the optical deflectors to achieve specifically directed light beams from a common light source.

The pattern and color of the laser or collimated pointer light corresponds to the energization source, or may be produced through indirect methods such as filtering or fluorescent filters which may be used to shift or alter the spectrum of the laser light. Moveover, in other applications the present invention may include highly collimated light sources to achieve the desired visual effect in place of the laser light source in the figures. Thus, the light may be selectively altered or changed according to the position of the beam on the face of the meter, to provide additional interpretation of the meter signal. Furthermore, the optical deflector may be formed to have serrations or other configurations to provide a plurality of angularly offset beams to selectively illuminate the segment of arc swept by the laser pointer according to the rotational position of the shaft 54.

Therefore, modifications, substitutions and variations of the present invention made by one skilled in the art is to be included within the scope of the present invention, which is not to be limited except by the claims which follow.

What is claimed is:
1. A meter comprising:
a dial having a plurality of designator means which are placed at predetermined locations per meter values and which reflect light;
a collimated light source;
a meter movement
proximate said dial and controllingly rotating light deflector means according to input signals;
media means for conducting light from said light source to said deflector means which in turn will direct collimated light at said designator means thereby indicating the value according to the input signal; and
wherein said deflector means is characterized by the absence of any pointing structure.
2. The meter of claim 1 wherein:
said light deflector means is movable about an axis through an angle and
rotationally directs said means modulating light through said angle.
3. The meter of claim 1 further including means for selective illumination of at least one strip of said surface of said dial.
4. The meter of claim 3 wherein said light deflector means further provides selective illumination of said surface simultaneously and co-directionally with directing collimated light at said designator means.
5. The meter of claim 1 wherein said light deflector means comprises one of a prism and a mirror.
6. The meter of claim 5, wherein said prism comprises a dove prism.
7. The meter of claim 1 wherein said collimated light source is a laser.
8. The meter of claim 7 wherein said laser is selectively operable to emit a light beam of different colors.
9. The meter of claim 1 further comprising:
a plurality of meter movements;
a plurality of light deflector means; and
an optical splitter providing said media means for conducting light from said collimated light source to each one of said plurality of light deflector means.
10. The meter of claim 9 wherein said collimated light source is a laser.
11. The meter of claim 1, further including means to provide an array of beams to illuminate an arc section of said dial.
12. An instrument cluster comprising:
a plurality of dials each having a plurality of designators on a surface thereof which are placed at predetermined locations per meter values and which reflect light;
a collimated light source providing at least one light beam; and
a plurality of positioning means each responsive to a signal, each said positioning means being proximate a respective dial, and each controllingly rotating light deflector means according to an input signal, and including
media means for conducting light from said collimated light to each said deflector means which in turn directs collimated light at said designator means thereby indicating the value according the input signal, wherein
said deflector means is characterized by the absence of any pointing structure.
13. The instrument cluster of claim 12 wherein said collimated light source is a laser.
14. The instrument cluster of claim 12 wherein said collimated light source is selectively operable to omit a light beam of different colors.

* * * * *